Patented Nov. 10, 1931

1,830,944

UNITED STATES PATENT OFFICE

CARL IMMERHEISER AND ERNST KNEBEL, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF COLORED CELLULOSE PLASTICS AND SOLUTIONS THEREOF

No Drawing. Application filed April 25, 1927, Serial No. 186,561, and in Germany May 26, 1926.

In the U. S. Patent 1,589,700 there is disclosed the production of colored celluloid, or analogous compositions from nitro or acetylcellulose, or of solutions of such compositions in which the celluloid or analogous composition is treated or mixed, in the presence of solvents if desired, with soluble or insoluble organic dyestuffs and in the absence of any large quantities of solvents dissolving such dyestuffs, or with earth or mineral pigments, by mechanical means, especially with the aid of rollers, or coloring matters in a highly dispersed condition are incorporated with the composition, so that the composition, when dissolved, forms a solution from which the dyestuff does not separate out appreciably, if at all, even during prolonged storage in a diluted condition, and then the resulting composition is, if required, dissolved in a solvent in which the coloring matter employed is almost or quite insoluble.

We have now found that it is possible to incorporate large quantities of the said coloring matters with celluloid or with other compositions made from cellulose esters or ethers in such a manner that the said coloring matters are in a so finely divided, practically colloidal state that they do not separate out to any appreciable extent from solutions of the celluloid or other composition in solvents incapable of dissolving the said coloring matters, even when the solutions are diluted and kept for a long time. For example, the amount of coloring matters which can be incorporated with the celluloid or other composition may be 25 per cent or more and may even exceed the amount of the cellulose compound present.

The solutions obtained by dissolving the colored compositions produced according to the present invention contain a very high proportion of coloring matters, with a relatively small amount of celluloid and the like, so that, by incorporating therewith colorless or only slightly colored compositions of the said kind, or other suitable compositions which are either plastic, or capable of being brought into a plastic condition, it is possible to obtain, by simple means, solutions of any desired tinctorial strength and suitable, for example, for producing coatings on leather, metal, glass, paper, textiles and the like. By mixing, rolling, kneading or similar treatment with slightly colored or colorless celluloid and the like, the solid colored compositions can also be brought into such a condition in respect of percentage of coloring matter that, when dissolved, they at once possess the desired tinctorial properties. The herein described method of working affords the great economical advantage that only a small portion of the celluloid and the like has to be subjected to mechanical treatment in association with the coloring matters.

It has been found that those of the said compositions which exhibit high mechanical strength, for example nitrocelluloses with low nitrogen content, the solutions of which furnish on evaporation films with specially good mechanical properties, are capable of taking up particularly large amounts of coloring matters in a state of very fine division, when subjected to mechanical treatment in association with coloring matters. The solutions of such compositions, however, are often highly viscous, and are therefore unsuitable for some purposes. It is advisable, in such cases, to incorporate the coloring matters in a fine state of division in the compositions of high mechanical strength and to prepare solutions therefrom in the form of lacquers ready for use by dissolving therein such colorless or faintly colored compositions of the said type as furnish solutions of low viscosity.

In treating nitrocellulose compositions which are preferably employed in a damp condition, a particular advantage is obtained, according to the present process in that, in consequence of the large proportion of coloring matters, the mechanical treatment is effected in a reliable and safe manner, and that the resulting products can be dried and stored without any risk of fire or explosion.

The following examples will further illustrate the nature of the said invention but the invention is not limited thereto. The parts are by weight.

*Example 1*

100 parts of a celluloid composition consisting of about 2/3 of a nitrocellulose with about 11 per cent of nitrogen, and about 1/3 of camphor, are rolled out thinly from 10 to 20 times with 200 parts of lithol fast scarlet R (see Schultz, Farbstofftabellen, 6th edition, p. 32, No. 73). 3 parts of the resulting composition are dissolved in a solution of 9 parts of celluloid in 88 parts of a solvent such as butyl- or amyl acetate, ethylene glycol monoethyl ether, or the like. In this way a solution is obtained which contains 2 parts of coloring matter in a highly dispersed condition for every 10 parts of celluloid. Consequently, of 12 parts of the solid contained in the lacquer ready for use, only 3 parts were subjected to mechanical treatment.

The celluloid may be replaced by analogous compositions made from nitro- or acetyl celluloses.

The lithol fast scarlet may be replaced by other organic pigment colors, or also by earth and mineral coloring matters such as colcothar, terra di Siena, Berlin blue, and the like.

*Example 2*

154 parts of a mixture of nitrocellulose and water, composed of 100 parts of a nitrocellulose with 11.8 to 12.3 per cent of nitrogen, and 54 parts of water, are rolled out thinly 10 times with 100 parts of phthalic acid di-ethyl ester and 250 parts of Berlin blue. 4 parts of the dried mass are dissolved in a colorless nitrocellulose lacquer composed of 11 parts of a nitrocellulose furnishing solutions of very low viscosity, 3 parts of phthalic acid di-ethyl ester, 3 parts of an ester resin and 70 parts of a solvent such as butyl acetate. Of the resulting, approximately 20 per cent lacquer, which contains the coloring matter in a highly dispersed and non-depositing condition, only 4 per cent was subjected to mechanical treatment.

What we claim is:

1. The process of making colored cellulose lacquers, which comprises mechanically working a cellulose derivative with at least an equal quantity of solid coloring matter until the latter is brought to a practically colloidal state of dispersion, and the composition thus obtained is in such a state as to give a practically non-settling solution with a lacquer solvent, and incorporating said composition with a cellulose ester lacquer.

2. The process of making colored cellulose lacquers, which comprises mechanically working a cellulose nitrate with at least an equal quantity of solid coloring matter until the latter is brought to a practically colloidal state of dispersion and the composition thus obtained is in such a state as to give a practically non-settling solution with a lacquer solvent, and incorporating said composition with a cellulose ester lacquer.

3. The process of making colored cellulose lacquers, which comprises mechanically working cellulose nitrate with at least an equal quantity of solid coloring matter and with water and a plasticizer until the coloring matter is brought to a practically colloidal state of dispersion and the composition is in such a state as to give a practically non-settling solution with a lacquer solvent, and incorporating said composition with a cellulose ester lacquer.

4. The process of making colored cellulose lacquers, which comprises mechanically working a cellulose derivative with at least an equal quantity of solid coloring matter until the latter is brought to a practically colloidal state of dispersion and the composition thus obtained is in such a state as to give a practically non-settling solution with a lacquer solvent, and incorporating said composition with a cellulose nitrate solution.

5. The process of making colored cellulose lacquers, which comprises mechanically working cellulose nitrate with at least an equal quantity of solid coloring matter and with water and a plasticizer until the latter is brought to a practically colloidal state of dispersion and the composition is in such a state as to give a practically non-settling solution, and incorporating said composition with a cellulose nitrate solution.

In testimony whereof we have hereunto set our hands.

CARL IMMERHEISER.
ERNST KNEBEL.